(12) United States Patent
Krome

(10) Patent No.: US 8,033,748 B2
(45) Date of Patent: Oct. 11, 2011

(54) PIVOTING ARRANGEMENT

(75) Inventor: Andreas Krome, Oberreichenbach (DE)

(73) Assignee: Schaeffler KG, Herzogenaurach (DE)

( * ) Notice: Subject to any disclaimer, the term of this patent is extended or adjusted under 35 U.S.C. 154(b) by 407 days.

(21) Appl. No.: 11/249,187

(22) Filed: Oct. 13, 2005

(65) Prior Publication Data

US 2006/0108310 A1    May 25, 2006

(30) Foreign Application Priority Data

Oct. 14, 2004    (DE) .......................... 10 2004 050 006

(51) Int. Cl.
    *B61G 5/00*    (2006.01)
(52) U.S. Cl. .......... 403/133; 403/135; 403/76; 213/75 R
(58) Field of Classification Search .................... 403/76, 403/77, 122, 131, 133, 135; 213/50, 75 R, 213/77
    See application file for complete search history.

(56) References Cited

U.S. PATENT DOCUMENTS

| | | | |
|---|---|---|---|
| 2,250,426 A | | 7/1941 | Dorn |
| 2,886,299 A | | 5/1959 | Heimaster et al. |
| 3,646,604 A | * | 2/1972 | Tack et al. .................... 213/75 R |
| 3,716,146 A | * | 2/1973 | Altherr ........................ 213/75 R |
| 4,485,743 A | | 12/1984 | Roush et al. |
| 4,577,989 A | * | 3/1986 | Ito ................................ 403/135 |
| 5,131,331 A | | 7/1992 | Lynch, Jr. |
| 5,456,185 A | * | 10/1995 | Rother et al. ................ 213/75 R |
| 5,586,506 A | * | 12/1996 | Heubusch et al. .............. 403/76 |
| 5,851,082 A | * | 12/1998 | Schmudde et al. ............ 403/133 |
| 6,237,785 B1 | * | 5/2001 | Daugherty, Jr. .............. 213/75 R |
| 6,685,377 B2 | * | 2/2004 | Nakata et al. ................. 403/135 |
| 2002/0192016 A1 | * | 12/2002 | Monninghoff et al. ........ 403/122 |

FOREIGN PATENT DOCUMENTS

| | | |
|---|---|---|
| BE | 728 101 A | 7/1969 |
| DE | 43 05 614 | 8/1994 |
| DE | 101 39 970 | 2/2003 |
| DE | 101 39 970 A1 | 2/2003 |
| FR | 2 695 612 A | 3/1994 |
| FR | 26 95 612 | 3/1994 |

* cited by examiner

*Primary Examiner* — Michael P Ferguson
(74) *Attorney, Agent, or Firm* — Lucas & Mercanti, LLP

(57) ABSTRACT

An arrangement for the articulated connection of wagons of a multiple-element vehicle with the aid of joint having spherical bearing faces, wherein comprising a radial pivoting bearing having an inner ring with a convexly curved spherical bearing face and an outer ring with a concavely curved spherical bearing face, the radial pivoting bearing being installed with a vertical bearing axis Z and the inner ring and the outer ring each being held by one connecting construction, the bearing of asymmetric configuration, the inner ring and the outer ring being arranged offset with respect to one another in the direction of the bearing axis Z, and, that in relation to a center point (M) of the inner ring, the bearing faces are larger in the direction of a negative Z axis extending downwards from the center point along the bearing axis, than the bearing faces in the direction of a positive Z axis extending upwards from the center point along the bearing axis.

6 Claims, 3 Drawing Sheets

PIVOTING ARRANGEMENT

FIELD OF THE INVENTION

The invention relates to an arrangement for the articulated connection of wagons of a multiple-element vehicle with the aid of a joint having spherical bearing faces.

BACKGROUND OF THE INVENTION

A pivoting arrangement of the generic type for connecting wagons of a multiple-element rail vehicle has been disclosed previously in EP 0 559 635 B1. It comprises two axial pivoting bearings which are arranged concentrically inside one another, the outer axial pivoting bearing functioning as the main bearing and the inner axial pivoting bearing functioning as an anti-lifting means. In order that no constraining forces can be introduced into the system, it is necessary for the bearing centre points of the two bearings to coincide. As a result of the construction of this bearing arrangement, axial forces (spreading forces) are produced, in the event of radial loads, counter to the weight of the housing lying on top by the compression angle of the axial pivoting bearings used. In particular in the event of accidents, the weight of the wagon part lying on top is not sufficient to compensate for the axial lifting force (spreading force) which is oriented in the opposite direction. For this lifting case, the inner pivoting bearing has to prevent the inner ring of the main bearing from jumping out of the outer ring and the pivoting connection therefore being released. For this purpose, the shaft plate of the inner bearing is connected to the housing by means of bolts or screws. Depending on the bearing construction, these screws have to absorb continuous dynamic or static loads.

The disadvantages of a bearing arrangement which is configured according to the generic type lie in the following areas:
- As a result of the complex construction, a large number of bearing constituent parts have to be manufactured and assembled.
- As the two bearing centre points have to coincide for the satisfactory functioning of the bearing arrangement, high manufacturing outlay is required.
- Axial lifting forces (spreading forces) on account of radial forces which occur have to be absorbed by additional components (threaded bolts).
- A complicated surrounding construction is also required on account of the complexity of the bearing arrangement.
- The bearing arrangement takes up a considerable amount of installation space on account of its complexity.

Similar bearing arrangements for the articulated connection of wagons of a multiple-element vehicle are described in DE 101 39 970 A1 and in WO 03/09265 A1. However, the abovementioned disadvantages apply here too, that is to say they consist of many individual constituent parts and require great accuracy in terms of manufacturing technology.

Although, in this context, applications of radial pivoting bearings in the coupling of vehicle units for rail vehicles are also known to the person skilled in the art, they differ substantially from the solution according to the invention. Thus, for example, DE 195 43 183 A1 describes a coupling between two railway wagons, which comprises a tie rod which is connected to one wagon and is held by an adjacent wagon. This is done in such a way that a connecting pin has a spherical outer face which is in turn held by a likewise curved bush. The bush is manufactured from an elastic material, with the result that the curved bush is deformed in the event of a pivoting movement of the tie rod in the horizontal direction. This in turn means that, in the strict sense, there is no radial pivoting bearing in which the two bearing rings can be pivoted with respect to one another without deformation. Moreover, this coupling is constructed in such a way that, via a connecting pin, a coupling fork passes through the curved bush which is arranged in the tie rod, the connecting pin being fixed in two fork cheeks which are spaced apart from one another in the axial direction. This means in turn that a connection of this type takes up a large amount of installation space in the axial direction.

Similar solutions, that is to say in which an elastic material is deformed in the event of the coupling fork and the coupling bracket pivoting, are apparent from DE 199 19 536 A1 and U.S. Pat. No. 4,485,743. A likewise negative aspect is the complicated attachment to the connecting constructions, that is to say a coupling fork is connected to a coupling bracket, with the result that a large amount of installation space is required in the axial direction.

SUMMARY OF THE INVENTION

Proceeding from the disadvantages of the known prior art, the invention is based on the object of providing a pivoting connection which is composed of few constituent parts and can be manufactured simply.

According to the invention, an arrangement for the articulated connection of wagons of a multiple-element vehicle with the aid of joint having spherical bearing faces, wherein comprising a radial pivoting bearing having an inner ring with a convexly curved spherical bearing face and an outer ring with a concavely curved spherical bearing face, the radial pivoting bearing being installed with a vertical bearing axis Z and the inner ring and the outer ring each being held by one connecting construction, the joint is configured as a radial pivoting bearing having an inner ring with a convexly curved spherical bearing face and an outer ring with a concavely curved spherical bearing face, the radial pivoting bearing being installed with a vertical bearing axis Z and the inner ring and the outer ring being held by in each case one connecting construction.

It is the object of the bearing according to the invention
- to transmit the tensile and compressive forces in the longitudinal direction of the vehicle (+/−X direction) during acceleration and braking,
- to transmit the transverse forces in the +/−Y direction when travelling around bends,
- to transmit the weight forces from one wagon part to the other in the −Z direction (oriented towards the rails),
- to absorb the tensile forces in the +Z direction in the event of accidents or repair work,
- to ensure the angular mobility about all three axes.

Radial pivoting bearings of this type comprise only the inner ring and the outer ring, and can be acquired inexpensively on the market in different sizes. The bearing construction and thus likewise the associated connecting construction are thus simplified substantially. No joint-separating axial forces are induced in the system at high radial loads, as a result of the construction as a radial pivoting bearing. In the case of an axially divided radial pivoting bearing, the spreading forces are absorbed by the material of the outer ring, with the result that no additional elements are required to hold the bearing arrangement together. A further advantage of the bearing according to the invention is its reduced weight, a small installation space with a simultaneously high radial and axial load-bearing capability.

It is thus apparent that a sliding layer is arranged between the inner ring and the outer ring, there being provision for the said sliding layer to be composed of PTFE (polytetrafluoroethylene) and to be configured as a composite material, film or as a woven fabric.

The sliding layer makes the pivoting bearing maintenance-free. It forms in each case the sliding raceway, transmits the forces which occur and provides the lubrication. PTFE composite material, PTFE film and PTFE woven fabric are each more efficient than the previous material, that is to say PTFE woven fabric is the most efficient sliding layer. There will not be a detailed explanation at this point of the difference between the abovementioned PTFE sliding layers, as they are described in detail in the INA catalogue 236 "Gelenklager, Gleitbuchsen, Gelenkköpfe" [Pivoting bearings, sliding bushes, articulation heads] on pages 48, 49 and 50.

In accordance with a further feature, there is provision for the outer ring to be split. This is required in order for it to be possible to assemble the radial pivoting bearing at all. As a rule, the split join will be oriented axially, in order to absorb forces which act in the travelling direction reliably by the outer ring.

There is provision for the radial pivoting bearing to be provided with a seal. This protects the bearing arrangement against the ingress of contaminants and is to be adapted to the operating and environmental conditions, although the radial mobility of the bearing and the corresponding pivoting angles are to be taken into consideration.

In accordance with a further different additional feature of the invention, there is provision for the radial pivoting bearing to be of asymmetric configuration, the inner ring and the outer ring being arranged offset with respect to one another in the direction of the bearing axis Z, and, in relation to a center point of the inner ring, the inner ring protruding beyond the outer ring upwards in the direction of the positive bearing axis Z and the outer ring protruding beyond the inner ring in the axial direction downwards in the direction of the negative bearing axis Z.

This asymmetric configuration ensures that the bearing can be adapted to the respective load conditions. The outer ring which is extended downwards ensures that the bearing can absorb axial forces which are increased in this direction and are induced by the weight of the connecting construction lying on top.

Finally, the connection between the inner ring and the connecting construction and the connection between the outer ring and the connecting construction are described.

There is provision for the inner ring to be provided with a cylindrical journal which is held by an associated recess of the connecting construction, both parts being connected to one another by a fastening means.

The inner ring is may be provided with a receptacle hole into which an associated journal of the connecting construction engages, and both parts are connected to one another by a fastening means.

Finally, the outer ring is may be held by a recess of the connecting construction and both parts are connected to one another by a fastening means.

The invention will be described in greater detail using the following exemplary embodiments.

DETAILED DESCRIPTION OF THE DRAWINGS

Figure 1:
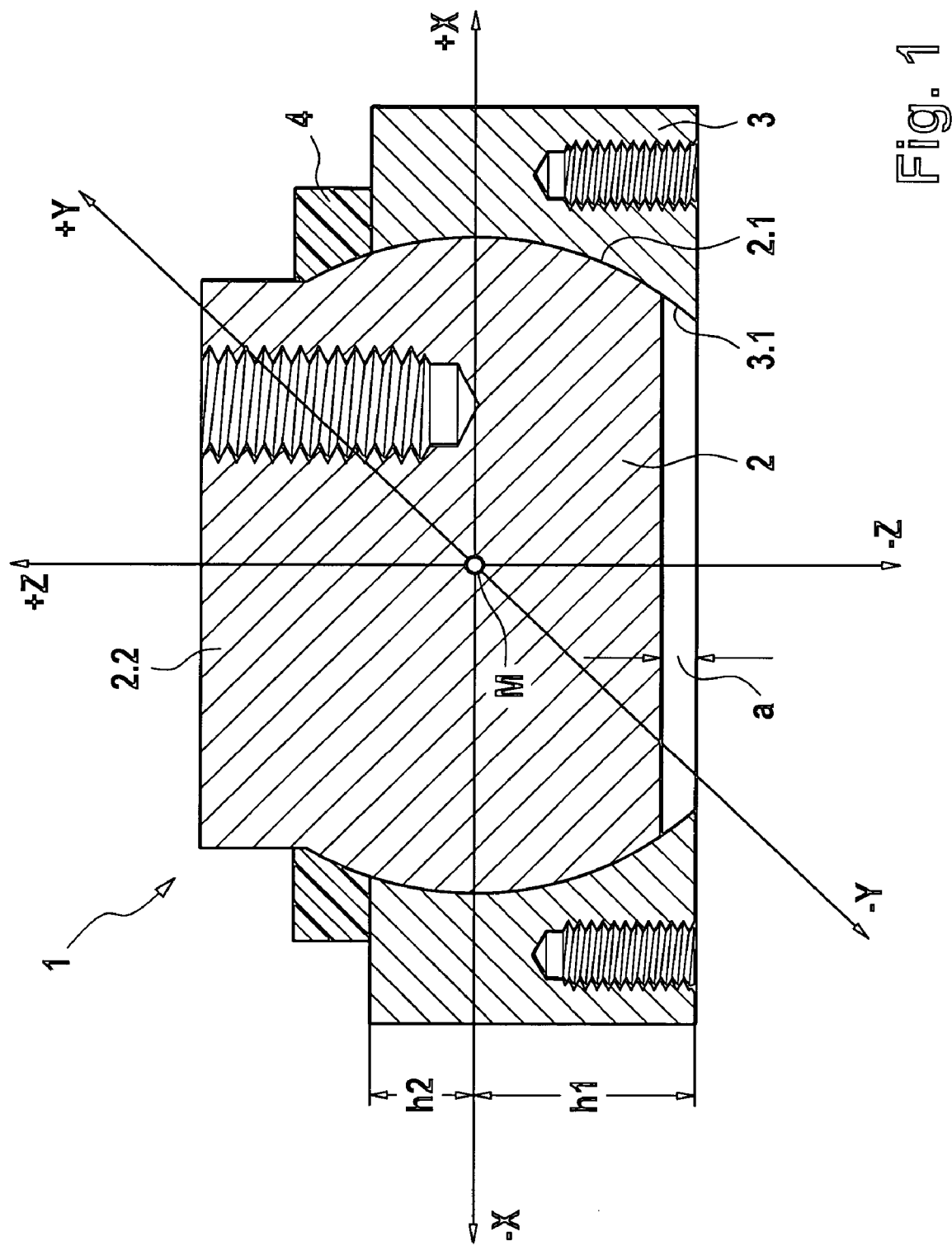
FIG. 1 shows a longitudinal section through a radial pivoting bearing according to the invention.

The radial pivoting bearing which is shown in FIG. 1, is sealed with the seal 4 and is provided with the reference numeral 1 comprises the inner ring 2 with the associated convexly curved bearing face 2.1 and the outer ring 3 with the associated concavely curved bearing face 3.1. Here, the diameters of the inner ring 2 and the outer ring 3 are adapted to one another in such a way that a suitable sliding layer is arranged optionally between the two which is, however, not shown in the drawing of the exemplary embodiment. A three-axis right-angled system of coordinates with the axes X, Y and Z is placed through the centre point M of the spherical part of the bearing inner ring 2, the horizontal axis X corresponding to the longitudinal direction of the vehicle. Longitudinal forces which result from acceleration and braking processes of the vehicle but are also produced by coupling or impact situations on the vehicle end sides are transmitted to the bearing in the X direction as radial forces. As a result of the structural shape, the bearing bears these forces via the spherical sliding faces 2.1, 3.1 of the inner ring 2 and the outer ring 3. The material of the outer ring 3 bears the spreading forces which are produced, no additional measures being required for the reliable transmission. The vertically oriented axis Z points with its negative sign in the direction of the support, that is to say in the direction of the rail body, and with its positive sign away from the rail body. In the direction of the axis Z, firstly weight forces of the connecting construction act, and secondly forces which emanate from the rail body. Finally, the axis Y belongs to the system of coordinates, transverse forces which occur when travelling around bends acting in the direction of the said axis Y.

Furthermore, as can be seen from FIG. 1, the radial pivoting bearing 1 is of asymmetrical configuration, the outer ring 3 having the height h1 in the direction of the negative Z axis, in relation to the centre point M, and the said outer ring 3 having the height h2 in the direction of the positive Z axis, h1 being greater than h2. Installation space is saved by this height h1 which is lower in the direction of the positive Z axis and is lower than in a normal radial pivoting bearing. However, it has to be high enough for maximum occurring tensile forces to be absorbed reliably on the inner ring 2 in the direction of the positive Z axis. As a result of the outer ring 3 which is extended asymmetrically downwards, the inner ring 2 is arranged in the latter, in the non-pivoted position, displaced upwards by the amount a, with the result that it can be pivoted about the axis Z without coming into contact with a connecting construction (not shown). Furthermore, FIG. 1 shows that the bearing faces 2.1, 3.1 of the bearing rings 2, 3 are of different size in the direction of the axis Z, starting from the centre point M. It can thus be seen that the bearing faces 2.1, 3.1 are larger in the direction of the negative Z axis than the bearing faces 2.1, 3.1 in the direction of the positive Z axis. This non-uniform distribution of the bearing faces 2.1, 3.1 ensures that the bearing has a higher axial load-bearing capability in the direction of the negative Z axis than in the direction of the positive Z axis. In this way, the inherent weight of the connecting construction lying on top can be supported reliably. The outer ring 3 is split axially on one side, in order that the inner ring 2 can be compressed in from above during assembly. However, it is also conceivable for the outer ring 3 to be of two-piece configuration, that is to say to be provided with two axial split joins.

Figure 2:
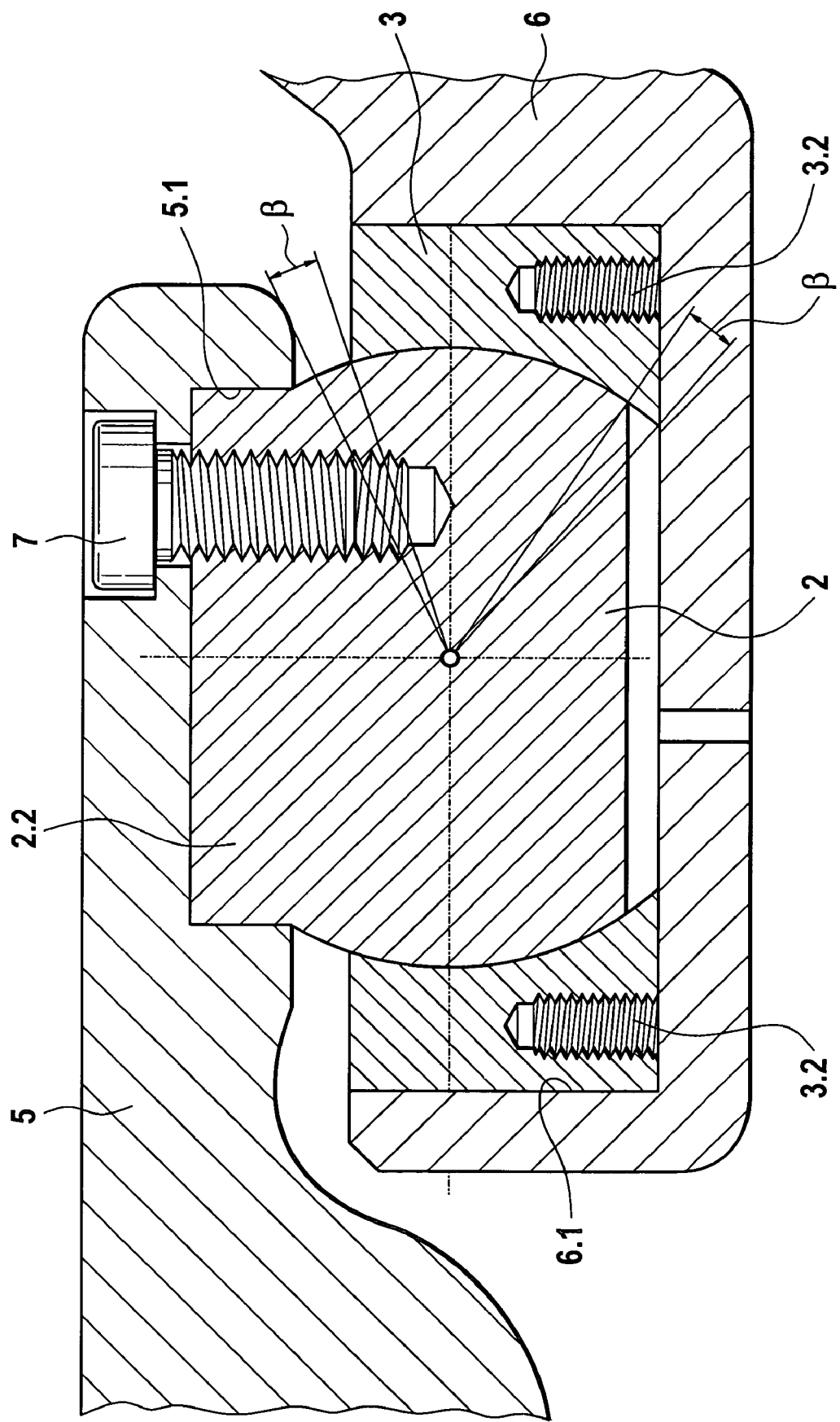
FIGS. 2 and 3 show a longitudinal section through a radial pivoting bearing according to the invention with associated connecting constructions.

The drawing in FIG. 2 shows the connection of a radial pivoting bearing 1 according to the invention to the connecting constructions 5, 6 which form wagons of a multiple-element vehicle which are arranged in a row behind one another. Adjacent to its convex bearing face 2.1, the inner ring 2 is provided with the cylindrical journal 2.2 which is surrounded by an associated recess 5.1 of the upper connecting construction 5. The connecting construction 5 and the inner ring 2 are connected to one another in such a way that both are attached fixedly to one another with the aid of the fastening screw 7. The outer ring 3 of the radial pivoting bearing 1 is received by a recess 6.1 of the lower connecting construction 6 and once again held via fastening screws which are not shown, however, in the exemplary embodiment. The said fastening screws pass through the lower connecting construction 6 and are screwed into the threaded holes 3.2 which are provided with a thread. The fastening of the inner ring 2 in the connecting construction 5 and the fastening of the outer ring 3 in the connecting construction 6 should not, however, be restricted to the above-described fastening screws 7. All fastening possibilities which are familiar to the person skilled in the art are conceivable. Thus, for example, it is possible for the upper end of the lower connecting construction 6 to be provided with an undercut for fastening the outer ring 3, into which undercut a slotted securing ring is inserted which then partially covers the upper axial face of the outer ring 3.

Furthermore, it can be gathered from the figure that the pivoting angle β is specified in the exemplary embodiment at approximately 7°. Here, pivoting angle is to be understood as a reversing relative movement of the two bearing rings 2, 3 with respect to one another about the bearing axis Z. In concrete terms, this means that, in the present case, the two connecting constructions 5, 6 can be pivoted with respect to one another by approximately 7° without touching one another.

Figure 3:
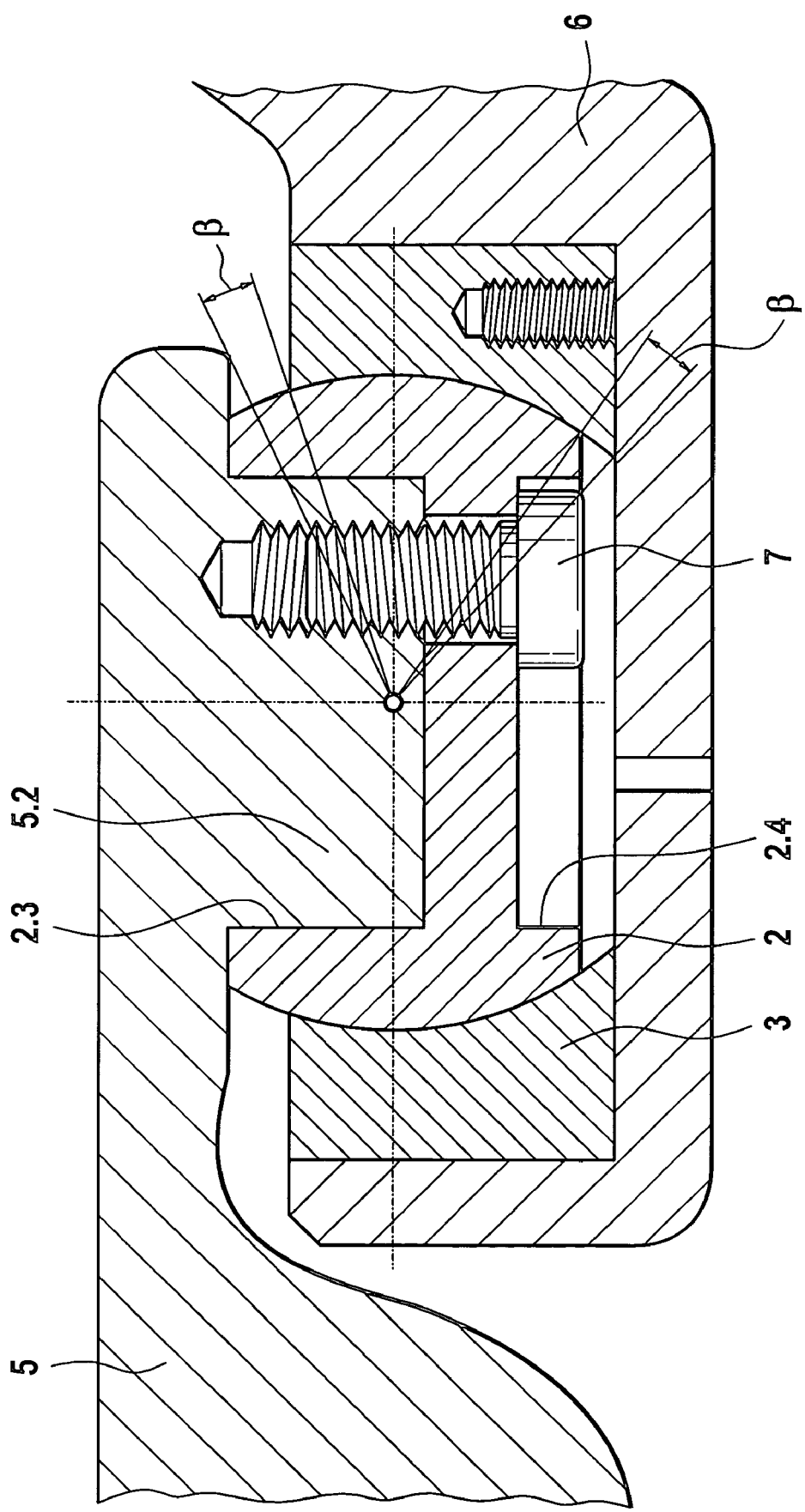

Finally, the drawing in FIG. 3 shows a further type of fastening of the inner ring 2 to the upper connecting construction 5. This is effected in such a way that the upper connecting construction 5 is provided with a journal 5.2 which is oriented in the axial direction and is inserted into an associated receptacle hole 2.3 of the inner ring 2. The inner ring 2 is provided with a further receptacle hole 2.4 at the opposite end-side end, with the result that the head of a fastening screw which is inserted into the upper connecting construction 5 through the inner ring 2 is inserted into this receptacle hole 2.4 and thus cannot impede the pivoting of the radial pivoting bearing 1.

LIST OF REFERENCE NUMERALS

1 Radial pivoting bearing
2 Inner ring
2.1 Convex bearing face
2.2 Cylindrical journal
2.3 Receptacle hole
2.4 Receptacle hole
3 Outer ring
3.1 Concave bearing face
3.2 Threaded hole
4 Seal
5 Upper connecting construction
5.1 Recess
5.2 Journal
6 Lower connecting construction
6.1 Recess
a Amount
h Height
M Centre point
β Pivoting angle

The invention claimed is:

1. A pivoting arrangement for an articulated connection of wagons of a multiple-element vehicle having spherical faces, the pivoting arrangement comprising:
a ball head having a ball stem, a flat end opposing the ball stem and a predominately convexly curved spherical outer surface with a constant radius providing a first contacting region;
an outer ring having opposing axially opposing outer surfaces each having a respective aligned opening and a concavely curved spherical inner surface with a constant radius extending between the openings and providing a second contacting region opposing the first contacting region of the ball head,
the outer ring being adapted to be mounted in a housing having a cavity for receiving the outer ring therein, and the outer ring matingly receiving the ball head such that the first contacting region of the ball head is contactable with the second contacting region of the outer ring and the ball stem extends through one of the openings and an opening of the cavity,
the ball stem being affixable to a first connecting part of one of the wagons of the multiple-element vehicle and the housing being affixable to a second connecting part of another of the wagons of the multiple-element vehicle,
whereby the arrangement is viewed from a three-dimensional right-angled system of coordinates having an X axis, a Y axis and a Z axis, where the Z axis is a longitudinal rotational pivoting axis passing longitudinally through the ball stem and the aligned openings of the outer ring and the cavity of housing and the arrangement has a center point, which is also a center of origin of the three-dimensional right-angled system of coordinates that is located at a center of the convexly curved spherical outer surface of the ball head,
whereby, in relation to the center point, which is the center of origin of the Z axis, the first contacting region of the ball head and the second contacting region of the outer ring both extend in a positive direction of the Z axis towards the ball stem and in a negative direction of the Z axis towards the flat end of the ball head with the first contacting region of the ball head and the second contacting region of the outer ring each extending further in the negative direction of the Z axis than in the positive direction of the Z axis, and the outer ring extending further in the negative direction of the Z axis than the ball head and the concavely curved spherical inner surface of the outer ring maintains the constant radius with the outer ring curving inwardly, toward the Z axis longitudinally offset from the flat end of the ball head, and
wherein a diameter of the convexly curved spherical outer surface of the ball head and a diameter of the concavely curved spherical inner surface of the outer ring are adapted to each other, so that forces from the first connecting part can be transmitted to the second connecting part and forces from the second connecting part can be transmitted to the first connecting part via the ball head and the outer ring.

2. The pivoting arrangement of claim 1, wherein a sliding layer is arranged between the ball head and the outer ring.

3. The pivoting arrangement of claim 2, wherein the sliding layer is composed of polytetrafluoroethylene and is configured as a composite material, film or woven fabric.

4. The pivoting arrangement of claim 1, wherein the outer ring is split.

5. The pivoting arrangement of claim 1, wherein the ball stem of the ball head is a cylindrical journal which is held by an associated recess in one of the connecting parts, the ball head and the one connecting part being connected to one another by a fastening means.

6. The pivoting arrangement of claim 1, wherein the outer ring and the housing are connectable to one another by fastening means.

\* \* \* \* \*